(12) United States Patent
Ogawa et al.

(10) Patent No.: US 10,967,842 B2
(45) Date of Patent: Apr. 6, 2021

(54) BRAKE HYDRAULIC PRESSURE CONTROLLER AND MOTORCYCLE BRAKE SYSTEM

(71) Applicant: Robert Bosch GmbH, Stuttgart (DE)

(72) Inventors: Takashi Ogawa, Kanagawa (JP); Kosaku Sagayama, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/463,249

(22) PCT Filed: Oct. 25, 2017

(86) PCT No.: PCT/IB2017/056617
§ 371 (c)(1),
(2) Date: May 22, 2019

(87) PCT Pub. No.: WO2018/096416
PCT Pub. Date: May 31, 2018

(65) Prior Publication Data
US 2020/0070791 A1    Mar. 5, 2020

(30) Foreign Application Priority Data
Nov. 25, 2016 (JP) .............................. JP2016-228863

(51) Int. Cl.
*H05K 3/40* (2006.01)
*B60T 8/36* (2006.01)
(Continued)

(52) U.S. Cl.
CPC ............ *B60T 8/368* (2013.01); *B60T 8/4022* (2013.01); *B60T 13/662* (2013.01); *B60T 15/025* (2013.01);
(Continued)

(58) Field of Classification Search
CPC ...... H01R 12/57; H01R 12/585; H01R 13/11; H01R 13/187; H01R 13/193; H01R 13/719; H05K 3/40
(Continued)

(56) References Cited

U.S. PATENT DOCUMENTS 6,132,011 A    10/2000    Iwamura et al.
6,144,127 A    11/2000    Heise
(Continued)

FOREIGN PATENT DOCUMENTS

DE        19735409       3/1999
DE     102011075225     11/2012
(Continued)

OTHER PUBLICATIONS

International Search Report for Application No. PCT/IB2017/056617 dated Feb. 19, 2019 (English Translation, 3 pages).

*Primary Examiner* — Christopher P Schwartz
(74) *Attorney, Agent, or Firm* — Michael Best & Friedrich LLP

(57) ABSTRACT

The invention has a purpose of obtaining a brake hydraulic pressure controller having improved vibration resistance and a motorcycle brake system including such a brake hydraulic pressure controller.
In the brake hydraulic pressure controller, an end (7Eb) of a metal piece (7E) is configured by including: a first portion and a second portion that are separated from each other; a first coupling section that couples one end of the first portion and one end of the second portion; a second coupling section that couples the other end of the first portion and the other end of the second portion; and a penetrating section, an outer periphery of which is configured by including the first portion, the second portion, the first coupling section, and the second coupling section, tongue pieces that are projected to an inner side of the penetrating section are respectively
(Continued)

formed in the middle of the first portion and the middle of the second portion, a slit-shaped clearance, in which a terminal is inserted, is formed between a tip of the tongue piece of the first portion and a tip of the tongue piece of the second portion, and middle sections of the first coupling section and the second coupling section have folded shapes.

7 Claims, 6 Drawing Sheets

(51) Int. Cl.
| | | |
|---|---|---|
| *B60T 8/40* | (2006.01) | |
| *B60T 13/66* | (2006.01) | |
| *B60T 15/02* | (2006.01) | |
| *F15B 13/00* | (2006.01) | |
| *F16K 27/00* | (2006.01) | |

(52) U.S. Cl.
CPC ..... *B60Y 2200/12* (2013.01); *F15B 2013/004* (2013.01); *F16K 27/003* (2013.01)

(58) Field of Classification Search
USPC .......... 303/116.4, 119.1–119.3; 439/858–862
See application file for complete search history.

(56) References Cited

U.S. PATENT DOCUMENTS

| | | | |
|---|---|---|---|
| 6,247,976 B1* | 6/2001 | Chiu .................... | H01R 13/113 439/857 |
| 6,786,466 B1 | 9/2004 | Risch et al. | |
| 7,771,243 B2* | 8/2010 | Peterson .............. | H01R 13/113 439/857 |
| 8,780,564 B2* | 7/2014 | Yanai .................... | B60T 13/686 137/557 |
| 2005/0088040 A1* | 4/2005 | Otsuka .................... | B60T 8/368 303/116.4 |
| 2006/0211310 A1* | 9/2006 | Zinn ...................... | H01R 13/11 439/857 |
| 2016/0164235 A1* | 6/2016 | Aporius .................. | H01R 4/48 439/122 |

FOREIGN PATENT DOCUMENTS

| | | |
|---|---|---|
| EP | 1983811 | 10/2008 |
| JP | 201151359 | 3/2011 |
| WO | 2012025509 | 3/2012 |

\* cited by examiner

X1-X1

X2-X2

BRAKE HYDRAULIC PRESSURE CONTROLLER AND MOTORCYCLE BRAKE SYSTEM

BACKGROUND OF THE INVENTION

The invention relates to a brake hydraulic pressure controller and a motorcycle brake system that includes the brake hydraulic pressure controller.

Conventionally, a vehicular braking system for a motorcycle (a two-wheeled motor vehicle or a three-wheeled motor vehicle) or the like can generate a braking force on wheels when an occupant of a vehicle operates a brake lever, and a pressure of a brake fluid in a brake fluid circuit is increased. It has also been known to adopt an antilock brake system (ABS) unit, for example, as a brake hydraulic pressure controller that regulates the braking force.

This brake hydraulic pressure controller can regulate the braking force generated on the wheels by increasing or lowering the pressure of the brake fluid in the brake fluid circuit.

As the brake hydraulic pressure controller, a controller in which a pump device that changes a pressure of an actuation fluid in the brake fluid circuit, a hydraulic pressure regulation valve used to increase or lower the pressure of the actuation fluid, a controller that controls the pump device and the hydraulic pressure regulation valve, and the like are unitized has been available (for example, see JP-A-2011-51359).

SUMMARY OF THE INVENTION

In the conventional brake hydraulic pressure controller, the pump device, which changes the pressure of the brake fluid in the brake fluid circuit, is driven by a motor. The motor is connected to a control unit (an electronic control unit) that includes a circuit board (an electronic substrate). For example, when vibrations occur due to traveling of the vehicle, driving of the motor, or the like, electrical connection between the motor and the circuit board becomes unstable.

The invention has been made with a problem as described above as the background and therefore has a purpose of obtaining a brake hydraulic pressure controller having improved vibration resistance and a motorcycle brake system including such a brake hydraulic pressure controller.

A brake hydraulic pressure controller according to the invention is a brake hydraulic pressure controller in which a terminal in a shape of a thin piece of a motor and a circuit board are connected via a metal piece formed by processing one metal sheet, an end of the metal piece on a side where the terminal is connected is configured by including: a first portion and a second portion that are separated from each other; a first coupling section that couples one end of the first portion and one end of the second portion; a second coupling section that couples the other end of the first portion and the other end of the second portion; and a penetrating section, an outer periphery of which is configured by including the first portion, the second portion, the first coupling section, and the second coupling section, tongue pieces that are projected to an inner side of the penetrating section are respectively formed in the middle of the first portion and the middle of the second portion, a slit-shaped clearance, in which the terminal is inserted, is formed between a tip of the tongue piece of the first portion and a tip of the tongue piece of the second portion, and middle sections of the first coupling section and the second coupling section have folded shapes.

A motorcycle brake system according to the invention includes the above-described brake hydraulic pressure controller.

According to the brake hydraulic pressure controller of the invention, in the metal piece that connects the terminal in the shape of the thin piece of the motor and the circuit board, the middle section of the first coupling section, which couples the one end of the first portion and the one end of the second portion, and the middle section of the second coupling section, which couples the other end of the first portion and the other end of the second portion have the folded shapes. Thus, vibration resistance of electrical connection between the motor and the circuit board is improved.

According to the motorcycle brake system of the invention, a high demand for the vibration resistance of a motorcycle can be satisfied by the above-described brake hydraulic pressure controller.

DETAILED DESCRIPTION

Figure 1:
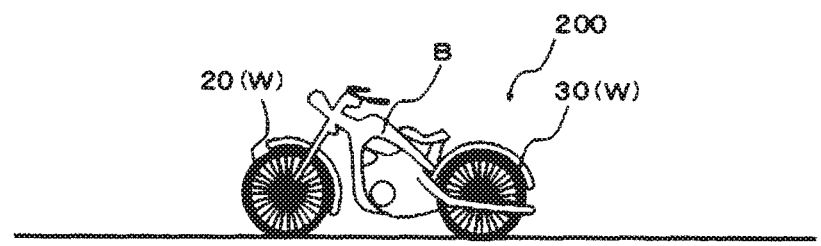
FIG. 1 is a schematic view of one example of a configuration of a motorcycle, on which a motorcycle brake system according to an embodiment is mounted.

A description will hereinafter be made on an embodiment of the invention with appropriate reference to the drawings.

Note that a description will hereinafter be made on a case where a brake hydraulic pressure controller according to the invention is used for a motorcycle; however, the brake hydraulic pressure controller according to the invention may be used for a vehicle other than the motorcycle (for example, an automobile, a truck, or the like). In addition, a description will hereinafter be made on a case where the brake hydraulic pressure controller according to the invention is applied to a brake system that includes a front-wheel hydraulic circuit and a rear-wheel hydraulic circuit; however, the brake hydraulic pressure controller according to the invention may be applied to a brake system that only includes one of the front-wheel hydraulic circuit and the rear-wheel hydraulic circuit.

A configuration, an operation, and the like, which will be described below, constitute merely one example, and the brake hydraulic pressure controller according to the invention is not limited to a case with such a configuration, such an operation, and the like. For example, the brake hydraulic pressure controller according to the invention may perform an operation other than that as an ABS.

There is a case where a dimensional relationship of components in each of the drawings differs from the actual dimensional relationship. In the drawings, the same members or portions or members or portions in a corresponding relationship will be denoted by the same reference sign or will not be denoted by the reference sign. In addition, in each of the drawings, detailed portions will appropriately be simplified or will not be depicted.

<External Appearance Configuration of Motorcycle 200>

A description will be made on a configuration of a motorcycle 200 by using FIG. 1. Note that, in the following description, a motorcycle brake system according to the embodiment will be referred to as a brake system 100.

FIG. 1 is a schematic view of one example of a configuration of the motorcycle, on which the motorcycle brake system according to the embodiment is mounted.

In the motorcycle 200, wheels W, a body B, and the brake system 100 are combined. The body B includes all components of the motorcycle 200 other than the brake system 100 and the wheels W. Note that, in this embodiment, a description will be made that the motorcycle 200 is a two-wheeled motor vehicle; however, the motorcycle 200 is not limited thereto and may be a three-wheeled motor vehicle.

<Overall Configuration of Brake System 100>

A description will be made on an overall configuration of the brake system 100 by using FIG. 2.

Figure 2:
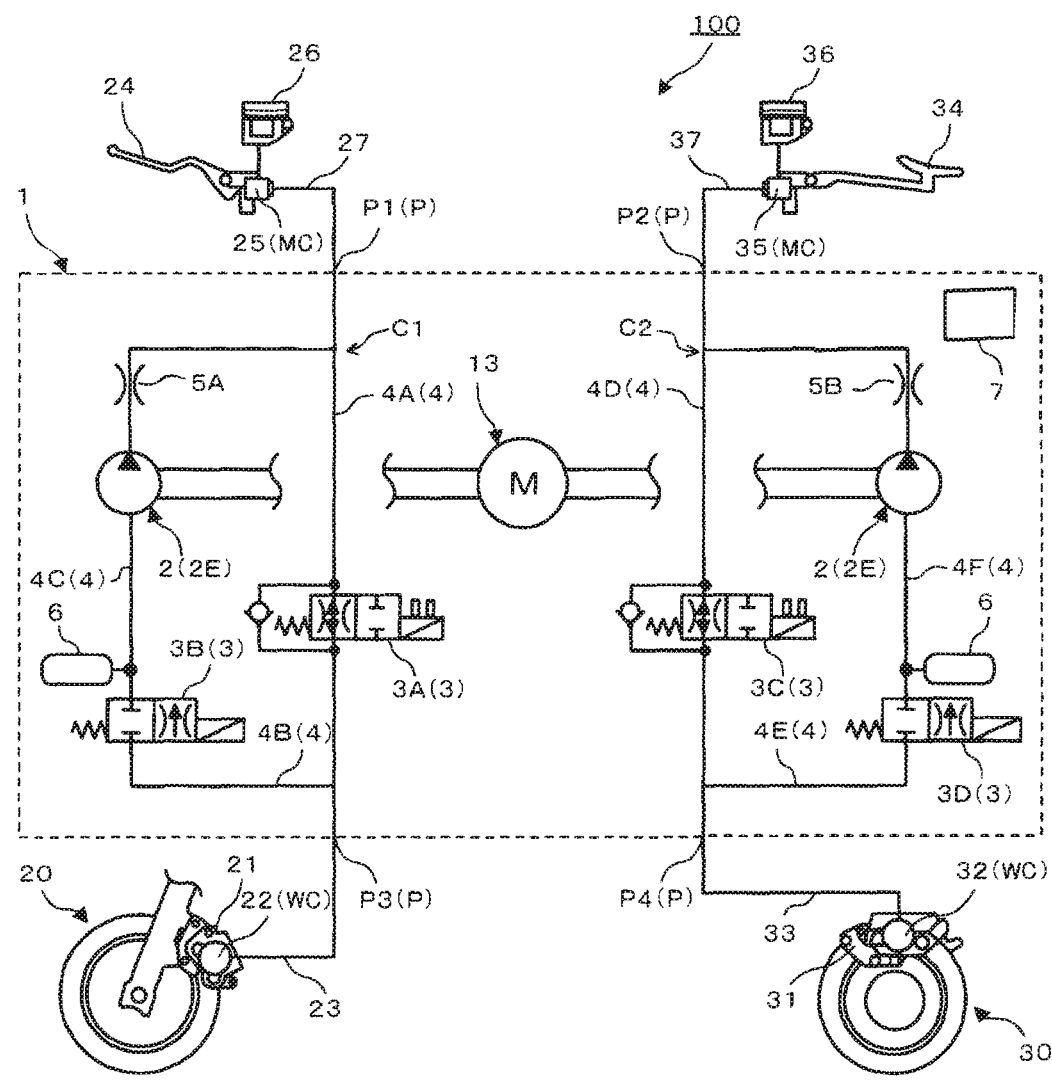
FIG. 2 is a schematic configuration diagram of the motorcycle brake system that includes a brake hydraulic pressure controller according to the embodiment.

FIG. 2 is a schematic configuration diagram of the motorcycle brake system that includes the brake hydraulic pressure controller according to the embodiment.

The brake system 100 includes a brake hydraulic pressure controller 1 that changes a braking force generated on the wheels W of the motorcycle 200.

The brake system 100 also includes a handlebar lever 24 and a foot pedal 34 that are operated by a user who drives the two-wheeled motor vehicle, or the like. When this handlebar lever 24 is operated, the braking force is generated on a front wheel 20. When the foot pedal 34 is operated, the braking force is generated on a rear wheel 30.

The brake system 100 includes: a front-wheel hydraulic circuit C1 through which a brake fluid used to generate the braking force on the front wheel 20 flows; and a rear-wheel hydraulic circuit C2 through which a brake fluid used to generate the braking force on the rear wheel 30 flows.

The brake system 100 includes the following configuration as a mechanism that generates the braking force on the front wheel 20, and the like. More specifically, the brake system 100 includes: a front brake pad 21 that is provided in a manner to correspond to the front wheel 20; a front wheel cylinder 22 in which a front brake piston (not depicted) actuating the front brake pad 21 is slidably provided; and a brake fluid pipe 23 that is connected to the front wheel cylinder 22.

Note that the front brake pad 21 is provided in a manner to hold a rotor (not depicted) that rotates with the front wheel 20 therebetween. The front brake pad 21, when being pressed by the front brake piston in the front wheel cylinder 22, abuts against the rotor and generates a friction force. In this way, the braking force is generated on the front wheel 20 that rotates with the rotor.

The brake system 100 includes: a first master cylinder 25 that is attached to the handlebar lever 24; a first reservoir 26 that stores the brake fluid; and a brake fluid pipe 27 that is connected to the first master cylinder 25. Note that a master cylinder piston (not depicted) is slidably provided in the first master cylinder 25. When the handlebar lever 24 is operated, the master cylinder piston in the first master cylinder 25 moves. Because a pressure of the brake fluid that is applied to the front brake piston is changed by a position of the master cylinder piston, a force of the front brake pad 21 to hold the rotor is changed. As a result, the braking force on the front wheel 20 is changed.

The brake system 100 includes the following configuration as a mechanism that generates the braking force on the rear wheel 30, and the like. More specifically, the brake system 100 includes: a rear brake pad 31 that is provided in a manner to correspond to the rear wheel 30; a rear wheel cylinder 32 in which a rear brake piston (not depicted) moving the rear brake pad 31 is slidably provided; and a brake fluid pipe 33 that is connected to the rear wheel cylinder 32.

Note that the rear brake pad 31 is provided in a manner to hold a rotor (not depicted) that rotates with the rear wheel 30 therebetween. The rear brake pad 31, when being pressed by the rear brake piston in the rear wheel cylinder 32, abuts against the rotor and generates a friction force. In this way, the braking force is generated on the rear wheel 30 that rotates with the rotor.

The brake system 100 includes: a second master cylinder 35 that is attached to the foot pedal 34; a second reservoir 36 that stores the brake fluid; and a brake fluid pipe 37 that is connected to the second master cylinder 35. Note that a master cylinder piston (not depicted) is slidably provided in the second master cylinder 35. When the foot pedal 34 is operated, the master cylinder piston in the second master cylinder 35 moves. Because a pressure of the brake fluid that is applied to the rear brake piston is changed by a position of the master cylinder piston, a force of the rear brake pad 31 to hold the rotor is changed. As a result, the braking force on the rear wheel 30 is changed.

<Configuration of Brake Hydraulic Pressure Controller 1>

A description will be made on a configuration of the brake hydraulic pressure controller 1 by using FIGS. 2 to 5.

Figure 3:
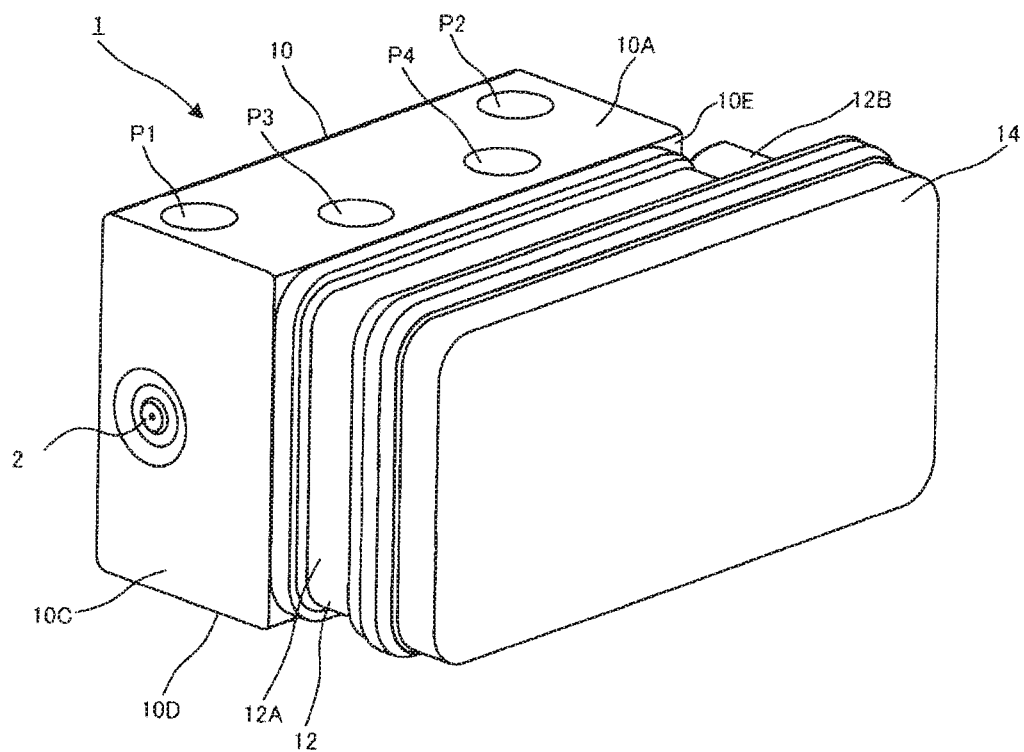
FIG. 3 is a perspective view of the brake hydraulic pressure controller according to the embodiment.

FIG. 3 is a perspective view of the brake hydraulic pressure controller according to the embodiment.

Figure 4:
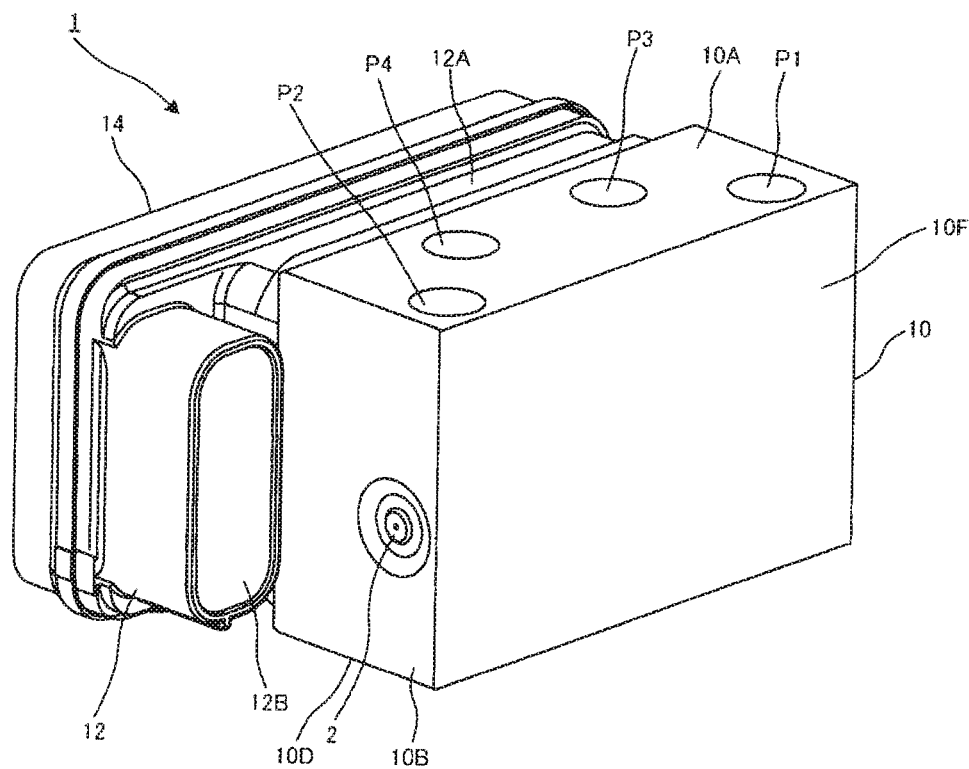
FIG. 4 is a perspective view of the brake hydraulic pressure controller according to the embodiment that is seen at a different angle from FIG. 3.

FIG. 4 is a perspective view of the brake hydraulic pressure controller according to the embodiment that is seen at a different angle from FIG. 3.

Figure 5:
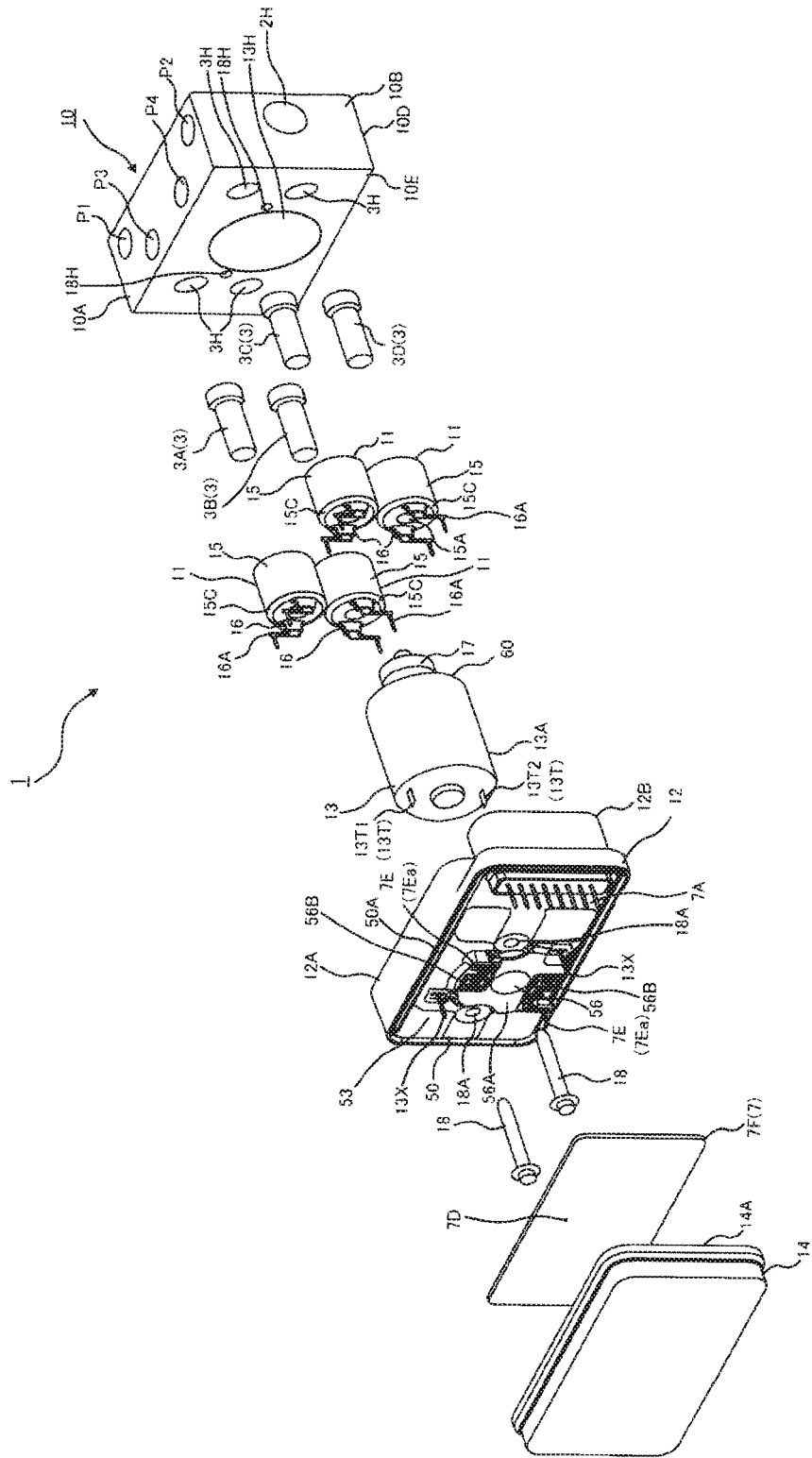
FIG. 5 is an exploded perspective view of the brake hydraulic pressure controller according to the embodiment.

FIG. 5 is an exploded perspective view of the brake hydraulic pressure controller according to the embodiment.

The brake hydraulic pressure controller 1 is configured by including: a base body 10 that is formed with an internal channel 4 (see FIG. 2) through which an actuation fluid flows; a pump device 2 that is assembled to the base body 10; hydraulic pressure regulation valves 3 that are freely openable/closable and are provided in the front-wheel hydraulic circuit C1 and the rear-wheel hydraulic circuit C2; drive coils 11 that respectively drive the hydraulic pressure regulation valves 3; a coil casing 12 that accommodates the drive coils 11; a motor 13 as a drive source of the pump device 2; a control unit 7 that includes a control section controlling operations of the pump device 2 and the hydraulic pressure regulation valves 3; a controller casing 14 that accommodates a circuit board 7F of the control unit 7; and the like.

As depicted in FIG. 3 and FIG. 4, exterior appearance of the brake hydraulic pressure controller 1 is configured that the base body 10, the coil casing 12, and the controller casing 14 are combined.

Next, a description will be made on a configuration of each component of the brake hydraulic pressure controller 1 with reference to FIG. 2 to FIG. 5.

(Base Body 10)

The base body 10 is made of metal such as aluminum and is formed of a substantially rectangular parallelepiped block. The base body 10 has a first surface 10A, a second surface 10B, a third surface 10C, a fourth surface 10D, a fifth surface 10E, and a sixth surface 10F.

The first surface 10A is a surface that is located on an upper side of the sheet in FIG. 3 and FIG. 4. The second surface 10B is a surface that is located on a left side of the sheet in FIG. 4. The third surface 10C is a surface that is located on the left side of the sheet in FIG. 3. The fourth surface 10D is a surface that is located on a lower side of the sheet in FIG. 3 and FIG. 4. The fifth surface 10E is a surface to which the coil casing 12 is attached in FIG. 3. The sixth surface 10F is a surface that is located on the right side of the sheet in FIG. 4.

In other words, the first surface 10A opposes the fourth surface 10D, the second surface 10B opposes the third surface 10C, and the fifth surface 10E opposes the sixth surface 10F.

The internal channel 4, through which the brake fluid flows, is formed in the base body 10.

The internal channel 4 is configured by including: a first internal channel 4A, a second internal channel 4B, and a third internal channel 4C, each of which constitutes a part of the front-wheel hydraulic circuit C1; and a fourth internal channel 4D, a fifth internal channel 4E, and a sixth internal channel 4F, each of which constitutes a part of the rear-wheel hydraulic circuit C2.

Various ports P are opened in the first surface 10A of the base body 10. The various ports P are configured by including: a first port P1 that corresponds to a drive mechanism including the handlebar lever 24 and the like; a second port P2 that corresponds to a drive mechanism including the foot pedal 34 and the like; a third port P3 that corresponds to a drive mechanism including the front brake pad 21 and the like; and a fourth port P4 that corresponds to a drive mechanism including the rear brake pad 31 and the like. The brake fluid pipe 27 is connected to the first port P1. The brake fluid pipe 37 is connected to the second port P2. The brake fluid pipe 23 is connected to the third port P3. The brake fluid pipe 33 is connected to the fourth port P4.

Of the internal channel 4, the first internal channel 4A is connected to an outflow side of the brake fluid in the pump device 2, a first booster valve 3A as one of the hydraulic pressure regulation valves 3, and the first port P1. In addition, the first internal channel 4A is provided with a first flow restrictor 5A that regulates a flow rate of the brake fluid flowing through the internal channel 4.

Of the internal channel 4, the second internal channel 4B is connected to the first booster valve 3A, a first reduction valve 3B as one of the hydraulic pressure regulation valves 3, and the third port P3.

Of the internal channel 4, the third internal channel 4C is connected to an inflow side of the brake fluid in the pump device 2 and the first reduction valve 3B. In addition, the third internal channel 4C is provided with an accumulator 6 that stores the brake fluid in the internal channel 4.

Of the internal channel 4, the fourth internal channel 4D is connected to the outflow side of the brake fluid in the pump device 2, a second booster valve 3C as one of the hydraulic pressure regulation valves 3, and the second port P2. In addition, the fourth internal channel 4D is provided with a second flow restrictor 5B that regulates the flow rate of the brake fluid flowing through the internal channel 4.

Of the internal channel 4, the fifth internal channel 4E is connected to the second booster valve 3C, a second reduction valve 3D as one of the hydraulic pressure regulation valves 3, and the fourth port P4.

Of the internal channel 4, the sixth internal channel 4F is connected to the inflow side of the brake fluid in the pump device 2 and the second reduction valve 3D. In addition, the sixth internal channel 4F is provided with an accumulator 6 that stores the brake fluid in the internal channel 4.

(Pump Device 2)

The pump device 2 includes two pump elements 2E that receive drive power from the motor 13 such as a DC motor. One of the pump elements 2E is used to deliver the brake fluid in the front-wheel hydraulic circuit C1 and delivers the brake fluid in the third internal channel 4C to the first internal channel 4A side. The other of the pump elements 2E is used to deliver the brake fluid in the rear-wheel hydraulic circuit C2 and delivers the brake fluid in the sixth internal channel 4F to the fourth internal channel 4D side. The pump element 2E reciprocates by rotary movement of an eccentric surface of an eccentric mechanism 17 that is driven by the motor 13. The pump elements 2E are respectively accommodated in pump openings 2H that are formed in the base body 10.

(Motor 13)

The motor 13 includes a motor section 13A that includes a casing, a stator, a rotor, and the like. The motor 13 is provided on the coil casing 12 side of the base body 10. An operation of the motor section 13A is controlled by the control unit 7. Two motor terminals 13T in shapes of thin pieces are vertically provided at an end of the motor section 13A on the coil casing 12 side. One of the motor terminals 13T is a positive terminal 13T1, and the other of the motor terminals 13T is a negative terminal 13T2.

(Eccentric Mechanism 17)

The eccentric mechanism 17 drives the pump device 2 by using rotary power that is transmitted from the motor 13. That is, the eccentric mechanism 17 transmits the rotary power, which is transmitted from the motor section 13A of the motor 13, to the pump device 2.

(Deceleration Mechanism 60)

A deceleration mechanism 60 is provided between the motor 13 and the eccentric mechanism 17, decelerates rotation generated in the motor section 13A of the motor 13, that is, amplifies torque, and transmits the torque to the eccentric mechanism 17. The deceleration mechanism 60 is attached to a rotary shaft of the motor 13 and is accommodated with a part of the motor 13 in a motor opening 13H that is formed in the base body 10.

(Hydraulic Pressure Regulation Valve 3 and Drive Coil 11)

Each of the hydraulic pressure regulation valves 3 is a valve that is provided to open/close the internal channel 4 of the base body 10. An operation of each of the hydraulic pressure regulation valves 3 is controlled by the control unit 7. The hydraulic pressure regulation valves 3 include the first booster valve 3A, the first reduction valve 3B, the second booster valve 3C, and the second reduction valve 3D.

Each of the hydraulic pressure regulation valves 3 can be configured as an electromagnetic valve that has the drive coil 11, for example, and an opened/closed state thereof is switched when energization thereof is controlled by the control unit 7.

In the drive coil 11, winding is accommodated in a cylindrical coil housing 15. One end side of the hydraulic pressure regulation valve 3 is accommodated in a columnar opening 15A that penetrates the coil housing 15. The other end side of the hydraulic pressure regulation valve 3 is accommodated in a regulation valve opening 3H that is formed in the fifth surface 10E of the base body 10. When the energization of the drive coil 11 is turned on/off in this state, a movable element of the hydraulic pressure regulation valve 3 that is accommodated in the base body 10 moves, and a valve body that interlocks with the movable element moves between a closed position and an open position.

One end of the coil housing 15 is fixed to the fifth surface 10E of the base body 10. A pair of terminal boards 16 is vertically provided at the other end 15C that opposes the one end of the coil housing 15. A coil terminal 16A is provided at a tip of each of the terminal boards 16, and power is supplied to the drive coil 11 via the coil terminal 16A.

(Accumulator 6)

The accumulator 6 is arranged in an accumulator opening (not depicted) that is formed in the base body 10.

(Control Unit 7)

The control unit 7 includes the circuit board 7F that is provided with an input section receiving signals from detection mechanisms, a processor section performing arithmetic processing, a memory section storing a program, and the like. The coil terminals 16A of the drive coils 11 and the motor terminals 13T of the motor 13 are connected to the circuit board 7F. That is, the circuit board 7F is formed with plural openings 7D, through each of which one end 7Ea of a metal piece 7E connected to the motor terminal 13T is inserted. Note that the metal piece 7E will be described below. In addition, the circuit board 7F is formed with plural openings (not depicted), through which the coil terminals 16A and pins 13X are respectively inserted.

Note that the control unit 7 includes various types of the detection mechanisms, each of which outputs the detection signal to the circuit board 7F. As the detection mechanisms, for example, an acceleration sensor used to obtain a gradient value of a road surface, a front-wheel speed sensor used to compute a wheel speed of the front wheel 20, a rear-wheel speed sensor used to compute a wheel speed of the rear wheel 30, and the like are provided.

In a state where the one end 7Ea of the metal piece 7E is inserted through the opening 7D, the circuit board 7F is brought into a parallel state with a first surface 50 of the coil casing 12. In this state, the circuit board 7F is accommodated in the controller casing 14. That is, when the one end 7Ea of the metal piece 7E is inserted through the opening 7D, the circuit board 7F of the control unit 7 is positioned and is attached in parallel with the first surface 50.

(Coil Casing 12)

The coil casing 12 is configured by including: a frame section 12A; and an accommodating section 12B that is formed on a side of the frame section 12A and accommodates a connector 7A connected to the control unit 7.

The frame section 12A is formed with coil holes 53 and a motor hole 56. When each of the drive coil 11 is accommodated in the coil hole 53, the coil terminal 16A is projected from the first surface 50 of the coil casing 12, and the circuit board 7F can thereby be connected thereto. When the motor 13 is accommodated in the motor hole 56, each of the motor terminal 13T penetrates a terminal opening 56B that is formed at a bottom 56A of the motor hole 56, is projected from the first surface 50 of the coil casing 12, and can thereby be connected to the other end of the metal piece 7E, the one end 7Ea of which is connected to the circuit board 7F.

The frame section 12A is formed with screw fixing holes 18A, in each of which a screw 18 is inserted. Each of the screw 18 is joined to a screw opening 18H that is formed in the base body 10, and the coil casing 12 is thereby held onto the fifth surface 10E of the base body 10.

The first surface 50 includes an edge 50A that abuts against an opening edge 14A of the controller casing 14 at a time when the controller casing 14 is attached to the coil casing 12.

Note that, as one example of the "casing" of the invention, the coil casing 12 that accommodates the drive coils 11 and the part of the motor 13 is exemplified herein; however, the "casing" of the invention is not limited to an aspect described herein. The "casing" of the invention only needs to accommodate at least the part of the motor 13, and thus may not accommodate the drive coils 11 or may accommodate a member other than the drive coils 11.

(Controller Casing 14)

The controller casing 14 is attached to the first surface 50 of the coil casing 12 and functions as a lid member that accommodates the circuit board 7F of the control unit 7 therein.

<Connection Structure of Motor Terminals 13T and Circuit Board 7F>

A description will be made on a connection structure of the motor terminals 13T and the circuit board 7F by using FIG. 6 to FIG. 10.

Figure 6:
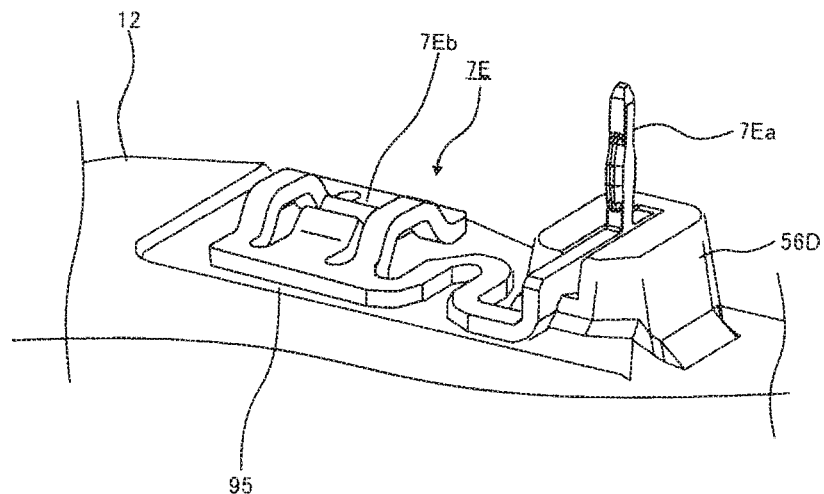
FIG. 6 is a perspective view of a state where a metal piece of the brake hydraulic pressure controller according to the embodiment is attached to a coil casing and in which the state is seen obliquely.

FIG. 6 is a perspective view of a state where the metal piece of the brake hydraulic pressure controller according to the embodiment is attached to the coil casing and in which the state is seen obliquely.

Figure 7:
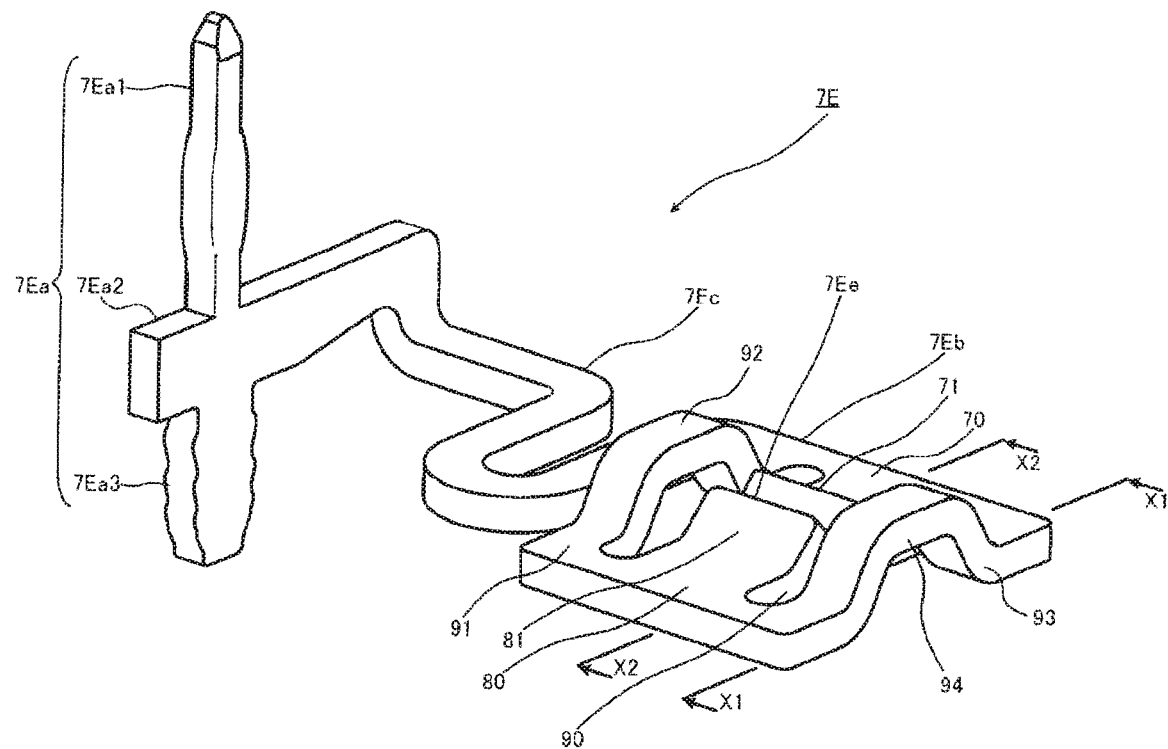
FIG. 7 is a perspective view in which the metal piece of the brake hydraulic pressure controller according to the embodiment is seen obliquely.

FIG. 7 is a perspective view in which the metal piece of the brake hydraulic pressure controller according to the embodiment is seen obliquely.

Figure 8:
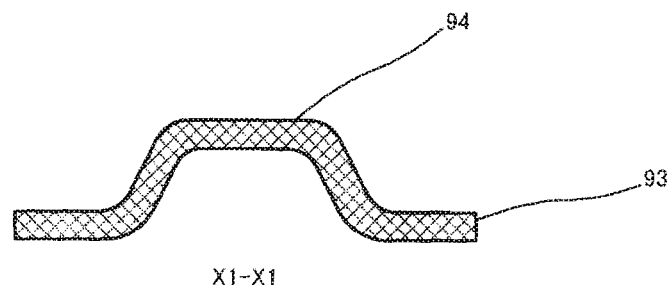
FIG. 8 is a cross-sectional view taken along X1-X1 in FIG. 7.

FIG. 8 is a cross-sectional view taken along X1-X1 in FIG. 7.

Figure 9:
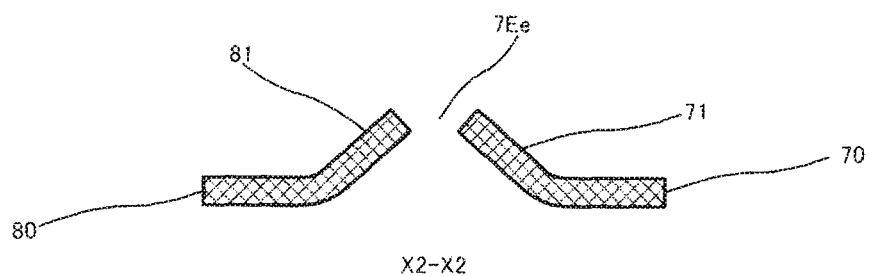
FIG. 9 is a cross-sectional view taken along X2-X2 in FIG. 7.

FIG. 9 is a cross-sectional view taken along X2-X2 in FIG. 7.

Figure 10:
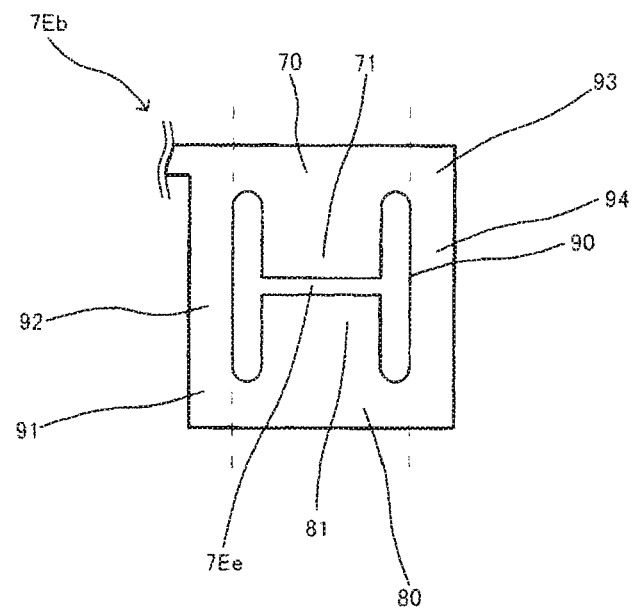
FIG. 10 is a plan view in which another end of the metal piece of the brake hydraulic pressure controller according to the embodiment is seen from above.

FIG. 10 is a plan view in which the other end of the metal piece of the brake hydraulic pressure controller according to the embodiment is seen from above.

As depicted in FIG. 6, the metal piece 7E is attached to the first surface 50 of the coil casing 12. As depicted in FIG. 7, the metal piece 7E is configured by including: the one end 7Ea; the other end 7Eb formed with a slit-shaped clearance 7Ee that communicates with the terminal opening 56B formed in the coil casing 12; and an intermediate extending section 7Ec that connects the one end 7Ea and the other end 7Eb. The one end 7Ea is inserted in the opening 7D of the circuit board 7F and is connected to the circuit board 7F. The motor terminal 13T, which penetrates the terminal opening 56B formed in the coil casing 12, is held in the slit-shaped clearance 7Ee at the other end 7Eb, and the other end 7Eb is thereby electrically connected to the motor terminal 13T. The metal piece 7E is manufactured by processing one metal sheet.

The one end 7Ea is configured by including a tip 7Ea1, a base 7Ea3, and an intermediate section 7Ea2 that connects the tip 7Ea1 and the base 7Ea3. In a state where the metal piece 7E is attached to the coil casing 12, the tip 7Ea1 is perpendicular to an outer surface (an attachment surface) of the coil casing 12. In the state where the metal piece 7E is attached to the coil casing 12, the intermediate section 7Ea2 extends in parallel with the outer surface (the attachment surface) of the coil casing 12. The base 7Ea3 is inserted in a hole (a recess) that is formed in a projection 56D formed in the coil casing 12. That is, the base 7Ea3 is inserted in the recess of the projection 56D, which is formed in the coil casing 12, and a bottom surface of this recess receives a lower surface of the base 7Ea3.

The other end 7Eb is configured by including: a first portion 70 and a second portion 80 that are separated from each other; a first coupling section 91 that couples one end of the first portion 70 and one end of the second portion 80; a second coupling section 93 that couples the other end of the first portion 70 and the other end of the second portion 80; and a penetrating section 90, an outer periphery of which is configured by including the first portion 70, the second portion 80, the first coupling section 91, and the second coupling section 93. The first portion 70 and the second portion 80 have symmetrical shapes about the penetrating section 90, and the first coupling section 91 and the second coupling section 93 have symmetrical shapes about the penetrating section 90.

As depicted in FIG. 7 and FIG. 10, the first portion 70 is a portion that is located on the intermediate extending section 7Ec side of the other end 7Eb, and is a portion that serves as one side of the other end 7Eb by being held between the first coupling section 91 and the second coupling section 93. In addition, a tongue piece 71 that is projected to an inner side of the penetrating section 90 is formed in the middle of the first portion 70.

As depicted in FIG. 7 and FIG. 10, the second portion 80 is a portion that is located on an opposite side of the first portion 70 of the other end 7Eb, and is a portion that serves as one side of the other end 7Eb by being held between the first coupling section 91 and the second coupling section 93. In addition, a tongue piece 81 that is projected to the inner side of the penetrating section 90 is formed in the middle of the second portion 80.

The slit-shaped clearance 7Ee, in which the motor terminal 13T is inserted, is formed by a tip of the tongue piece 71 of the first portion 70 and a tip of the tongue piece 81 of the second portion 80. The tongue piece 71 and the tongue piece 81 have symmetrical shapes about the slit-shaped clearance 7Ee. In addition, as depicted in FIG. 7 and FIG. 9, the tip of the tongue piece 71 and the tip of the tongue piece 81 are bent in an insertion direction of the motor terminal 13T.

As depicted in FIG. 8, cross-sectional shapes of a middle section 92 of the first coupling section 91 and a middle section 94 of the second coupling section 93 in a state of being seen in a direction along the slit-shaped clearance 7Ee are folded shapes. The middle section 92 and the middle section 94 are formed by being bent in shapes that bulge in the insertion direction of the motor terminal 13T.

The intermediate extending section 7Ec connects the one end 7Ea and the other end 7Eb, meanders as depicted in FIG. 6, for example, and crawls along the first surface 50 of the coil casing 12.

The projection 56D may be formed by projecting a part of the first surface 50 of the coil casing 12 to an outer side. However, the projection 56D may be formed of a different member from the coil casing 12.

In a state where a lower side of the one end 7Ea is supported by the bottom of the hole of the projection 56D, the one end 7Ea is inserted in the opening 7D of the circuit board 7F. With such a configuration, significant deformation of the metal piece 7E can be prevented during attachment of the circuit board 7F, and thus a chance of connection failure is reduced. In addition, as depicted in FIG. 6, vibration resistance can be improved by providing a clearance 95 between the other end 7Eb of the metal piece 7E and the coil casing 12.

<Dimensional Relationship of the Other End 7Eb of Metal Piece 7E>

A description will be made on a dimensional relationship of the other end 7Eb of the metal piece 7E by using FIG. 11 and FIG. 12.

Figure 11:
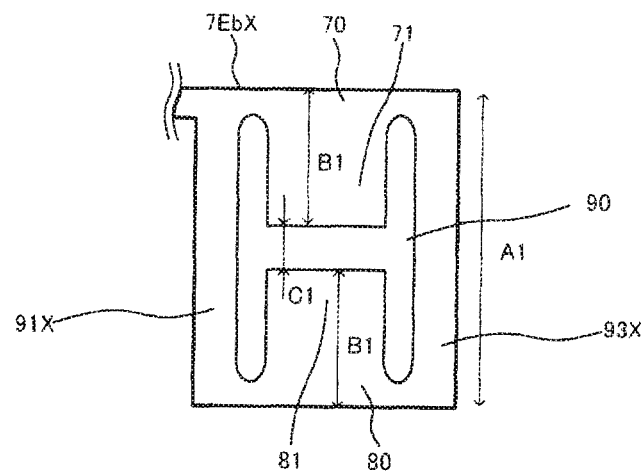
FIG. 11 is a plan view in which a state before completion of the other end of the metal piece of the brake hydraulic pressure controller according to the embodiment is seen from the above.

FIG. 11 is a plan view in which a state before completion of the other end of the metal piece of the brake hydraulic pressure controller according to the embodiment is seen from the above.

Figure 12:
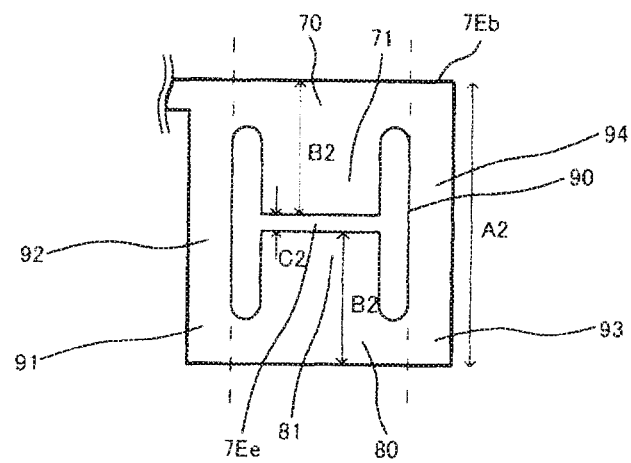
FIG. 12 is a plan view in which a state after the completion of the other end of the metal piece of the brake hydraulic pressure controller according to the embodiment is seen from the above.

FIG. 12 is a plan view in which a state after the completion of the other end of the metal piece of the brake hydraulic pressure controller according to the embodiment is seen from the above.

FIG. 11 depicts each dimension of the other end 7EbX of the metal piece 7E in a state before the tips of the tongue pieces 71, 81, the middle section 92, and the middle section 94 are bent (that is, a state where the tips of the tongue pieces 71, 81, the middle section 92, and the middle section 94 are deformed to be flat).

Length of each of a portion 91X that serves as the first coupling section 91 and a portion 93X that serves as the second coupling section 93 is set as "A1". Length from an edge of the other end 7EbX to the tip of the tongue piece 71 of the first portion 70 and length from the edge of the other end 7EbX to the tip of the tongue piece 81 of the second portion 80 are each set as "B1". Width of the penetrating section 90 between the tip of the tongue piece 71 and the tip of the tongue piece 81 is set as "C1".

FIG. 12 depicts each dimension of the other end 7Eb of the metal piece 7E in a state after the tips of the tongue pieces 71, 81, the middle section 92 and the middle section 94 are bent (that is, a state of being attached to the coil casing 12). Length of each of the first coupling section 91 and the second coupling section 93 is set as "A2". Length from the edge of the other end 7Eb to the tip of the tongue piece 71 of the first portion 70 in a plan view and length from the edge of the other end 7Eb to the tip of the tongue piece 81 of the second portion 80 in a plan view are each set as "B2". Length of the slit-shaped clearance 7Ee between the tip of the tongue piece 71 and the tip of the tongue piece 81 is set as "C2".

Preferably, the following dimensional relationships are established.

A1>A2
B1>B2
C1>C2
B1+B1<A2

That is, in a state where the folded middle section 92 of the first coupling section 91 and the folded middle section 94 of the second coupling section 93 are deformed to be flat and the bent tip of the tongue piece 71 of the first portion 70 and the bent tip of the tongue piece 81 of the second portion 80 are deformed to be flat, the tips of the tongue piece 71 and the tongue piece 81 are prevented from contacting each other.

In addition, the length of the first coupling section 91 and the second coupling section 93 in the state after being bent is set to be greater than a sum of the length from the edge of the other end 7EbX to the tip of the tongue piece 71 of the first portion 70 and the length from the edge of the other end 7EbX to the tip of the tongue piece 81 of the second portion 80 in the state before being bent. In this way, both of a connection property of the motor terminal 13T in the slit-shaped clearance 7Ee and elasticity and strength of the first coupling section 91 and the second coupling section 93 are secured.

<Effects>

According to the brake hydraulic pressure controller 1 of the embodiment, the motor terminal 13T and the circuit board 7F are connected via the metal piece 7E, which is formed by processing the one metal sheet, and the middle section 92 of the first coupling section 91 and the middle section 94 of the second coupling section 93 that constitute the other end 7Eb of the metal piece 7E have the folded shapes. Accordingly, vibrations can be absorbed by the first coupling section 91 and the second coupling section 93, and thus the vibration resistance of the electrical connection between the motor terminal 13T and the circuit board 7F is improved.

According to the brake hydraulic pressure controller 1 of the embodiment, the shapes of the tip of the tongue piece 71 of the first portion 70 and the tip of the tongue piece 81 of the second portion 80 are the bent shapes in the insertion direction of the motor terminal 13T. Accordingly, the vibration resistance of the electrical connection between the motor terminal 13T and the circuit board 7F is further improved.

According to the brake hydraulic pressure controller 1 of the embodiment, the shapes of the middle section 92 of the first coupling section 91 and the middle section 94 of the second coupling section 93 are the bulging shapes in the insertion direction of the motor terminal 13T, and a bent direction of the tip of the tongue piece 71 of the first portion 70 and the tip of the tongue piece 81 of the second portion 80 and a bent direction of the middle section 92 of the first coupling section 91 and the middle section 94 of the second coupling section 93 are unified. Accordingly, the metal piece 7E can be manufactured by being processed in one direction, and thus manufacturability is improved.

According to the brake hydraulic pressure controller 1 of the embodiment, cross-sections of the middle section 92 of the first coupling section 91 and the middle section 94 of the second coupling section 93 in the state of being seen in the direction along the slit-shaped clearance 7Ee have the folded shapes. Accordingly, the dimension of the slit-shaped clearance 7Ee can be optimized by folding, and thus freedom in the dimension of the slit-shaped clearance 7Ee is improved.

According to the brake hydraulic pressure controller 1 of the embodiment, in the states where the folded middle section 92 of the first coupling section 91 and the folded middle section 94 of the second coupling section 93 are deformed to be flat and the bent tip of the tongue piece 71 of the first portion 70 and the bent tip of the tongue piece 81 of the second portion 80 are deformed to be flat, the tips of the tongue piece 71 and the tongue piece 81 do not contact each other. Accordingly, despite a structure in which the tip of the tongue piece 71 of the first portion 70 and the tip of the tongue piece 81 of the second portion 80 are bent in addition to the middle section 92 of the first coupling section 91 and the middle section 94 of the second coupling section 93, the metal piece 7E can be manufactured from the one metal sheet, and thus the manufacturability is improved.

According to the brake hydraulic pressure controller 1 of the embodiment, the other end 7Eb is provided in the casing (the coil casing 12) with the clearance 95. Accordingly, the electrical connection between the motor terminal 13T and the circuit board 7F is prevented from becoming unstable due to the vibrations generated on the casing side.

The brake hydraulic pressure controller 1 according to the embodiment is mounted on the motorcycle brake system of the motorcycle 200. Differing from the other vehicles, a request for the vibration resistance of mounted equipment in the motorcycle 200 is especially high. Therefore, the brake hydraulic pressure controller 1 according to the embodiment is particularly useful for the motorcycle brake system of the motorcycle 200.

REFERENCE SIGNS LIST

1: Brake hydraulic pressure controller
2: Pump device
3: Hydraulic pressure regulation valve
4: Internal channel
7: Control unit
7A: Connector
7D: Opening
7E: Metal piece
7Ea: One end
7Eb, 7EbX: The other end
7Ec: Intermediate extending section
7Ee: Clearance
7F: Circuit board
10: Base body
11: Drive coil
12: Coil casing
12A: Frame
12B: Accommodating section
13: Motor
13T: Motor terminal
14: Controller casing
15: Coil housing
16A: Coil terminal
17: Eccentric mechanism
18: Screw
20: Front wheel
21: Front brake pad
22: Front wheel cylinder
23: Brake fluid pipe
24: Handlebar lever
25: First master cylinder
26: First reservoir
27: Brake fluid pipe
30: Rear wheel
31: Rear brake pad
32: Rear wheel cylinder
33: Brake fluid pipe
34: Foot pedal
35: Second master cylinder
36: Second reservoir
37: Brake fluid pipe
50: First surface
53: Coil hole
56: Motor hole
56A: Bottom
56B: Terminal opening
56D: Projection
60: Deceleration mechanism
70: First portion
71: Tongue piece
80: Second portion
81: Tongue piece
90: Penetrating section
91: First coupling section
92: Middle section
93: Second coupling section 94: Middle section
95: Clearance
100: Brake system
200: Motorcycle
C1: Front-wheel hydraulic circuit
C2: Rear-wheel hydraulic circuit

The invention claimed is:

1. A brake hydraulic pressure controller (1) comprising a terminal (13T) of a motor (13), the terminal being a tab; and
a circuit board (7F) connected to the terminal (13) via a metal piece (7E) formed of a single metal sheet, wherein
an end (7Eb) of the metal piece (7E), on a side to which the terminal (13T) is connected, is configured by including:
a first portion (70) and a second portion (80) that are separated from each other;
a first coupling section (91) including a bulge in an insertion direction of the terminal (13T), the bulge coupling one end of the first portion (70) and one end of the second portion (80);
a second coupling section (93) including a bulge in the insertion direction of the terminal (13T), the bulge coupling an other end of the first portion (70) and an other end of the second portion (80); and
a penetrating section (90), an outer periphery of which is configured by including the first portion (70), the second portion (80), the first coupling section (91), and the second coupling section (93),
wherein tongue pieces (71, 81) that are projected to an inner side of the penetrating section (90) are respectively formed in a middle of the first portion (70) and a middle of the second portion (80),
wherein a slit-shaped clearance (7Ee) in which the terminal (13T) is inserted is formed between a tip of the tongue piece (71) of the first portion (70) and a tip of the tongue piece (81) of the second portion (80), and
wherein the tip of the tongue piece (71) of the first portion (70) and the tip of the tongue piece (81) of the second portion (80) are bent in the insertion direction of the terminal (13T).

2. The brake hydraulic pressure controller according to claim 1, wherein
cross sections of a middle section (92) of the first coupling section (91) and a middle section (94) of the second coupling section (93) when viewed in a direction along the slit-shaped clearance (7Ee) have bulging shapes.

3. The brake hydraulic pressure controller according to claim 2, wherein
wherein the bulging shape of each of the middle sections (92, 94) has two angled portions, each of the two angled portions extending away from a respective one of the first portion (70) and the second portion (80).

4. The brake hydraulic pressure controller according to claim 3,
wherein the bulging shape of each of the middle sections (92, 94) has a flat portion that extends between the two angled portions and that is parallel to the first portion (70) and to the second portion (80).

5. The brake hydraulic pressure controller according to claim 2, wherein
when the bulging middle section (92) of the first coupling section (91) and the bulging middle section (94) of the second coupling section (93) are deformed to be flat and when the bent tip of the tongue piece (71) of the first portion (70) and the bent tip of the tongue piece (81) of the second portion (80) are also deformed to be flat, the tip of the tongue piece (71) of the first portion (70) and the tip of the tongue piece (81) of the second portion (80) do not contact each other.

6. The brake hydraulic pressure controller according to claim 1, wherein
the metal piece (7E) is provided in a casing (12) that accommodates the motor (13), and
there is a clearance between the end (7Eb) of the metal piece (7E) and the casing (12).

7. A motorcycle brake system comprising:
the brake hydraulic pressure controller (1) according to claim 1.

* * * * *